(12) United States Patent
Dinan

(10) Patent No.: US 8,520,538 B2
(45) Date of Patent: Aug. 27, 2013

(54) METHOD AND SYSTEM FOR MANAGING TRAFFIC IN A WIRELESS COMMUNICATION SYSTEM

(75) Inventor: Esmail Hejazi Dinan, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 592 days.

(21) Appl. No.: 12/712,651

(22) Filed: Feb. 25, 2010

(65) Prior Publication Data
US 2011/0205916 A1   Aug. 25, 2011

(51) Int. Cl.
*H04W 24/00*   (2009.01)

(52) U.S. Cl.
CPC ................. *H04W 24/00* (2013.01)
USPC ........................................... 370/252

(58) Field of Classification Search
CPC ................................. H04W 24/00
USPC ............................................. 370/252
See application file for complete search history.

(56) References Cited

U.S. PATENT DOCUMENTS

| | | | |
|---|---|---|---|
| 7,933,221 B1* | 4/2011 | Pawar et al. | 370/253 |
| 8,005,087 B2* | 8/2011 | Dolganow et al. | 370/392 |
| 8,018,955 B2* | 9/2011 | Agarwal et al. | 370/401 |
| 2010/0088756 A1* | 4/2010 | Balakrishnan et al. | 726/13 |
| 2010/0132031 A1* | 5/2010 | Zheng | 726/13 |
| 2010/0235877 A1* | 9/2010 | Hu et al. | 726/1 |
| 2011/0106491 A1* | 5/2011 | Karassiouk | 702/155 |
| 2011/0138470 A1* | 6/2011 | Davis et al. | 726/25 |

\* cited by examiner

*Primary Examiner* — Ricky Ngo
*Assistant Examiner* — Phuongchau B Nguyen
(74) *Attorney, Agent, or Firm* — O'Brien Jones, PLLC

(57) ABSTRACT

An inspection node receives an event to begin monitoring a traffic flow where the event comprises a flow identifier associated with the traffic flow. The inspection node receives the traffic flow where the traffic flow comprises a plurality of packets and begins inspecting the plurality of the packets to obtain an application identifier. Based upon the flow identifier and the application identifier, the inspection node performs a sampling process on the traffic flow. After determining the end of the traffic flow, the inspection node terminates the sampling process.

19 Claims, 4 Drawing Sheets

METHOD AND SYSTEM FOR MANAGING TRAFFIC IN A WIRELESS COMMUNICATION SYSTEM

TECHNICAL BACKGROUND

Wireless communication is a growing means for accessing a network and provides certain advantages over wired communications for accessing networks. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

With the growth in wireless networks, new and advanced applications have been introduced for use on wireless devices. Through these advances with wireless devices, wireless communication networks need to adapt to the ever growing demand for wireless resources. For example, many wireless devices now allow for the use of high-bandwidth applications such as video streaming, file sharing, and voice over IP services just to name a few. As these new applications become more prevalent, wireless network operators and manufacturers must be prepared to handle the demands that are being placed on their resources.

OVERVIEW

In various embodiments, systems and methods are provided to manage and evaluate data traffic in a wireless communication system. In an embodiment, an inspection node receives an event to begin monitoring a traffic flow where the event comprises a flow identifier associated with the traffic flow. The inspection node receives the traffic flow where the traffic flow comprises a plurality of packets and begins inspecting the plurality of the packets to obtain an application identifier. Based upon the flow identifier and the application identifier, the inspection node performs a sampling process on the traffic flow. After determining the end of the traffic flow, the inspection node terminates the sampling process.

DETAILED DESCRIPTION

In an embodiment, a deep packet inspection (DPI) system samples data flows in an intelligent manner based upon various traffic characteristics of the wireless broadband technology data streams. Some characteristics that are considered include the type of application, the quality of service assigned to a data flow and other wireless network data parameters. FIGS. 1-4 and the following description depict specific embodiments in greater detail that teaches those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
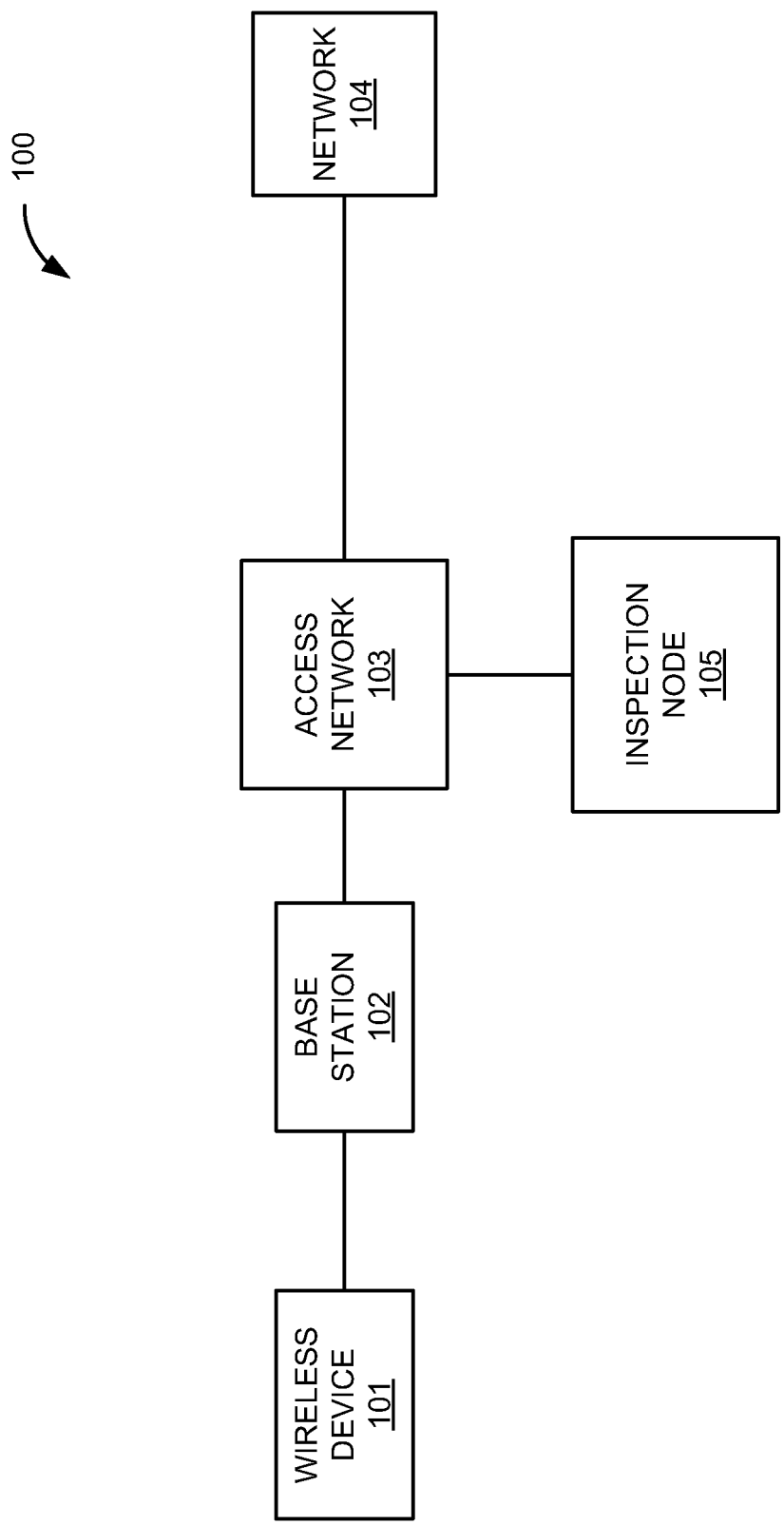
FIG. 1 is a block diagram illustrating a wireless communication system.

FIG. 1 is a block diagram illustrating wireless communication system 100. Wireless communication system comprises wireless device 101, base station 102, access network 103, network 104 and inspection node 105. Wireless device exchanges information with base station 102, base station exchanges information with access network 103, and access network 103 exchanges information with network 104. This allows wireless device 101 to communicate with other users, applications and devices that are available through communicating through network 104. Additionally, inspection node 105 receives and sends information with access network 103 and thereby can exchange information with wireless device 101, base station 102 and network 104. Although inspection node 105 is shown to be in communication with access network 103, inspection node 105 may communicate directly with any network element in the communication path between wireless device 101 and network 104.

Figure 2:
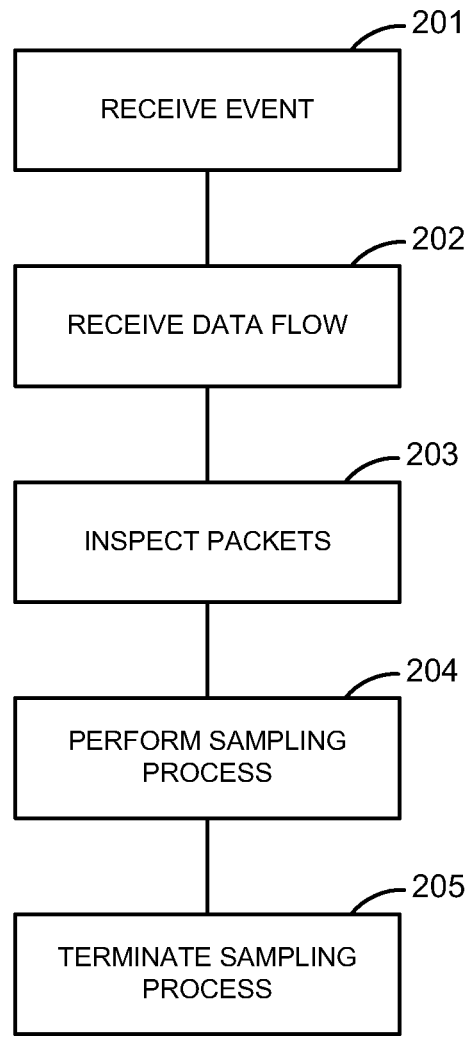
FIG. 2 is a flow diagram illustrating a method of operating a wireless communication system.

In operation, FIG. 2 is a flow diagram illustrating a method of operating wireless communication system 100. Inspection node 105 receives an event that notifies inspection node 105 to begin monitoring a traffic flow (201). The event comprises a flow identifier that is associated with the traffic flow. The event may also include additional information for the traffic flow including, but not limited to, a service flow identifier, an internet protocol address, a quality of service type and quality of service parameters. Additionally, the event may be communicated to inspection node 105 through a signal path, a bearer path or a combination of the data paths that would enable inspection node 105 to detect and process the event.

Inspection node 105 receives the traffic flow that is comprised of a plurality of packets (202). A traffic flow can be any one-way or two-way data communication between wireless device 101 and network 104 that provides communication access to other users, applications and devices. Examples of traffic flows may include but are not limited to telephone service, long distance service, mobile voice service, mobile data service, push-to-talk service, internet service, web browsing, email, peer-to-peer file sharing, pictures, picture messaging, video, video messaging, audio, voicemail, music, MP3's, ring tones, stock tickers, news alerts, and so on.

The traffic flow comprises a plurality of data packets where each of the data packets may have application signatures or attributes that are associated with the data packet. For example, a data packet typically contains multiple header information and payload data that is associated with the headers. Within the payload of the data packets, attributes exist that provide information on the type of application that the data packet is associated with. For example, the data packet may include one or more of: (1) a user indicator that is associated with a user of the wireless device; (2) an application indicator that is associated with an application that originated the data packet; (3) a device indicator that is associated with a wireless device that originated or is going to receive the data packet; and, (4) a base station indicator that is associated with a wireless network resource that will, or has, carried the data packet. Additional attributes may also be included.

Upon receiving a traffic flow, inspection node 105 begins inspecting the plurality of packets to obtain an application identifier (203). Inspecting the plurality of packets includes the ability to examine the payload of the data packets. Examining the packet payloads allows inspection node 105 to use application signatures to identify the specific application that generated the packet that may not be available in the layer 1 or layer 2 header information.

In some embodiments, the flow identifier may be mapped to an internet protocol (IP) address to facilitate the inspection node to identify the appropriate data packets within the service flow. In some wireless networks, flow identifiers or service flow IDs are assigned to traffic flows arriving and departing from the wireless network interface with a core IP network. As shown in FIG. 1, inspection node 105 is illustrated as being in communication with access network 103 so that it can obtain traffic flows that are identified using IP protocols. Inspection node 105, in this particular embodiment, is configured to analyze data packets as IP data flows. Alternatively, inspection node 105 may receive data packets in a wireless protocol format. Examples of wireless protocols include code division multiple access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), General Packet Radio Services (GPRS), Worldwide Interoperability for Microwave Access (WiMAX) and the like.

Inspection node 105 then performs a sampling process on the traffic flow (204). The sampling process used on the traffic flow is based upon the flow identifier and the application identifier. Certain traffic flows and applications require more sampling than others. When processing significant amounts of data packets, inspection node 105 may require processing power that is inefficient to employ—either from a cost perspective or an implementation perspective. It may be advantageous for inspection node 105 to examine and inspect data traffic flows without consuming unnecessary resources while retaining accurate traffic characterization information.

Sampling may be referred to as the frequency of examining data packets within a traffic flow. Adjusting the sampling frequency is one way of reducing demands on inspection node 105. As mentioned above, certain traffic flows or application may not require high rates of sampling. For example, if the traffic flow or application is identified as a voice-over IP flow, then a very low sampling frequency would be necessary to identify the traffic flow rate because the flow rate is known and invariable during the traffic flow session. A higher sampling frequency may be required for applications involving non-real-time applications, such as instant messaging, web browsing or email applications where the flow rates may be highly variable and uncertain.

Inspection node 105 terminates the sampling process on the traffic flow upon determining the end of the traffic flow (205). Inspection node 105 may terminate the sampling process by detecting the end of the traffic flow. In another embodiment, inspection node 105 may terminate the sampling process after receiving a termination message from access network 103. The termination message may be received through a signaling channel, a data bearer channel, or a combination of the two that allows communication between access network 103 and inspection node 105.

Figure 3:
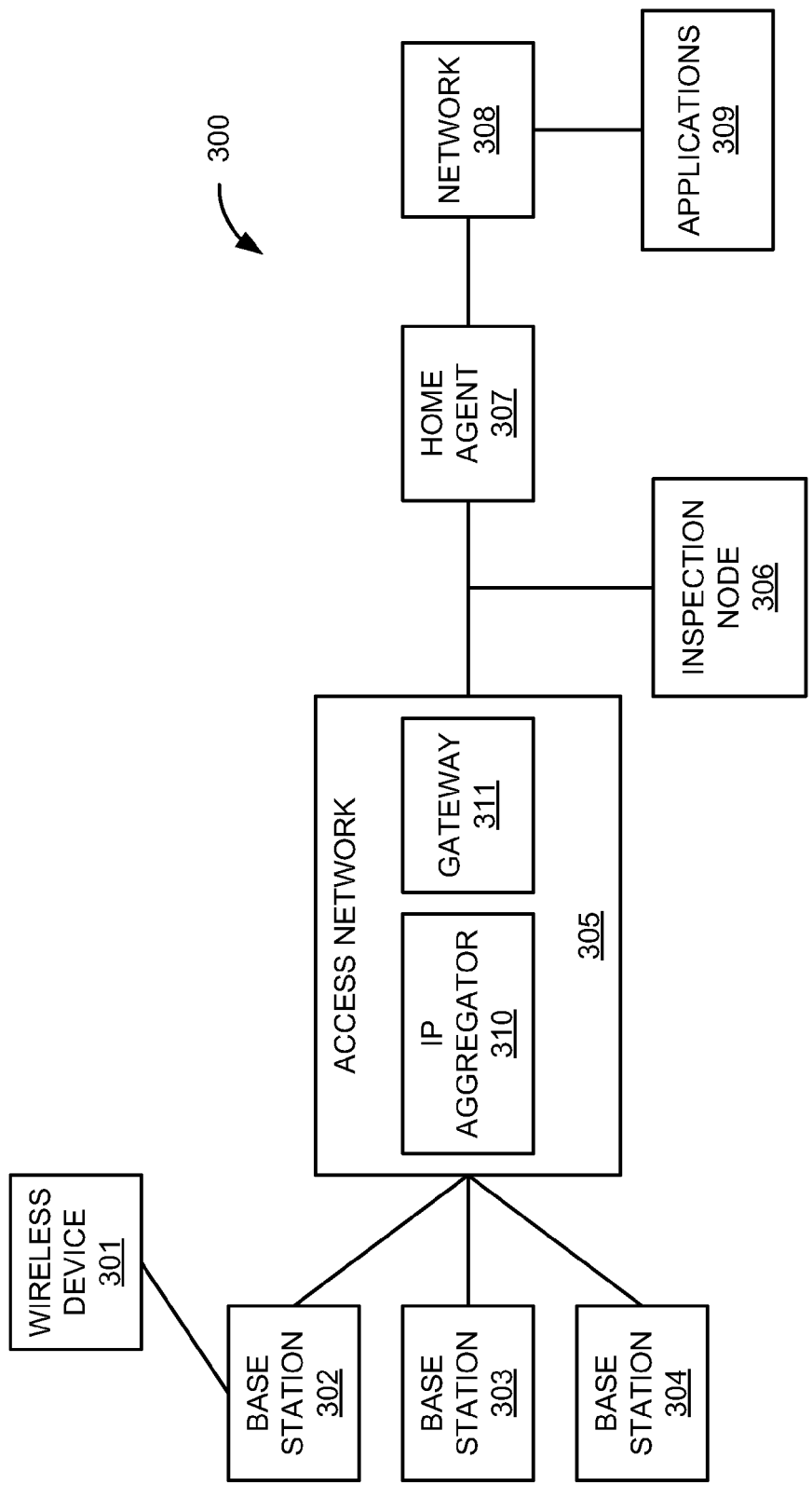
FIG. 3 is a block diagram illustrating a wireless communication system.

FIG. 3 is a block diagram illustrating wireless communication system 300. Wireless communication system 300 comprises wireless device 301, base station 302, base station 303, base station 304, access network 305, inspection node 306, home agent 307, network 308, and applications 309. Access network further comprises IP aggregator 310 and gateway 311.

Wireless device 301 is illustrated as being in communication with base station 302. Base stations 302, 303, and 304 exchange information with access network 305 and access network 305 exchanges information with network 308 via home agent 307. Thus, a communication path is established between wireless device 301 and network 308. Network 308 also exchanges information with applications 309 that allows wireless device 301 to have access to applications 309.

Figure 4:
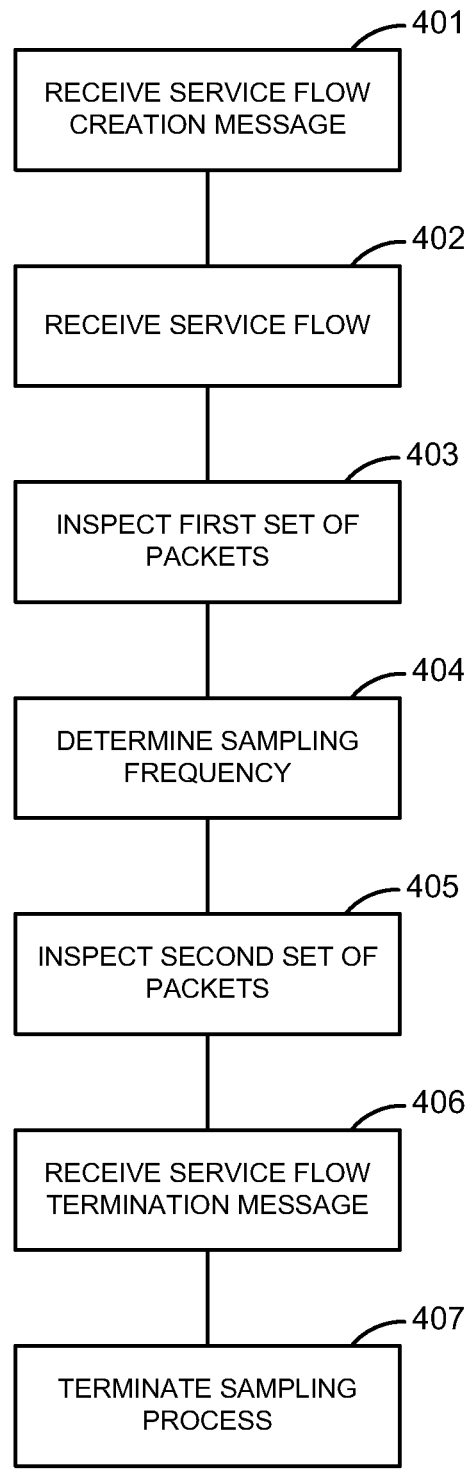
FIG. 4 is a flow diagram illustrating a method of operating a wireless communication system.

In operation, FIG. 4 is a flow diagram illustrating a method of operating wireless communication system 300. Inspection node 306 receives a service flow creation message over a gateway to inspection node signaling channel (401). The service flow creation message alerts inspection node 306 to begin monitoring a service flow from gateway 311. The service flow creation message comprises a service flow identifier and a policy identifier. Additionally, service flow creation messages may be performed for service flows on the uplink or downlink channels servicing wireless device 301.

Inspection node 306 begins receiving the service flow over a gateway to inspection node data link (402). A service flow can be any one-way or two-way data communication between wireless device 301 and network 308 that provides communication access to other users, applications and devices. Examples of service flows may include but are not limited to telephone service, long distance service, mobile voice service, mobile data service, push-to-talk service, internet service, web browsing, email, peer-to-peer file sharing, pictures, picture messaging, video, video messaging, audio, voicemail, music, MP3's, ring tones, stock tickers, news alerts, and so on.

The service flow comprises a plurality of data packets where each of the data packets may have application signatures or attributes that are associated with the data packet. For example, a data packet typically contains multiple header information and payload data that is associated with the headers. Within the payload of the data packets, attributes exist that provide information on the type of application that the data packet is associated with. For example, the data packet may include one or more of: (1) a user indicator that is associated with a user of the wireless device; (2) an application indicator that is associated with an application that originated the data packet; (3) a device indicator that is associated with a wireless device that originated or is going to receive the data packet; and, (4) a base station indicator that is associated with a wireless network resource that will, or has, carried the data packet. Additional attributes may also be included.

Inspection node 306 inspects a first set of packets in the service flow and obtains an application identifier to determine the application associated with the service flow (403). Inspecting the plurality of packets includes the ability to examine the payload of the data packets. Examining the packet payloads allows inspection node 306 to use application signatures to identify the specific application that generated the packet that may not be available in the layer 1 or layer 2 header information.

In some embodiments, the flow identifier may be mapped to an internet protocol (IP) address to facilitate the inspection node to identify the appropriate data packets within the service flow. In some wireless networks, flow identifiers or service flow IDs are assigned to traffic flows arriving and departing from the wireless network interface with a core IP network. As shown in FIG. 3, inspection node 306 is illustrated in communication with access network 305 at the IP interface with home agent 307 so that it can obtain traffic flows that are identified using IP protocols. Inspection node 306, in this particular embodiment, is configured to analyze data packets as IP data flows. Alternatively, inspection node 306 may receive data packets in a wireless protocol format directly from access network 305. Examples of wireless protocols include code division multiple access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), General Packet Radio Services (GPRS), Worldwide Interoperability for Microwave Access (WiMAX) and the like.

Upon determining the application identifier and using the service flow identifier, inspection node 306 determines a sampling frequency for the service flow (404). Certain service flows and applications require more sampling than others. When processing significant amounts of data packets, inspection node 306 may require processing power that is inefficient to employ—either from a cost perspective or an implementation perspective. It may be advantageous for inspection node 306 to examine and inspect data traffic flows without consuming unnecessary resources while retaining accurate traffic characterization information.

In an embodiment, inspection node 306 may use the policy identifier to determine a network policy associated with a service flow or application to determine the sampling frequency. A network policy for a service flow may comprise an application type, a protocol type, a quality of service type, a maximum sustained traffic rate, a minimum reserved traffic rate and a maximum traffic burst for each service flow.

Examples of network policies associated with a traffic flow or an application could include a policy for a voice over internet protocol (VoIP) application, a peer-to-peer file sharing application, a web-browsing application, and any other application that may be run from a wireless device. Service level policies or agreements may be, for example, associated with a throughput rate cap that limits a wireless device or user, associated with a total amount of data (e.g., Gigabytes per month) that a wireless device or user is allowed to receive (or send) over a given time period, or associated with an amount of data a wireless device or user may use for a particular type of application (i.e. a user policy may limit the use of an application so that no more than 10% of that data can be associated with a certain application).

A quality of service (QoS) profile associated with a user account utilizing the communication system is another example of a network policy that may be evaluated by inspection node 306. A user account may include any information about a subscriber utilizing the communication system illustrated in FIG. 3. Examples of subscriber information would include identity information, the type of subscription plan or contract, credit information, and other information that would be typically associated with a wireless subscription with a network operator. The user account could also include a QoS profile for the user account. The QoS profile comprises permissions and restrictions for use of the communication system or network for the user to utilize services on the network. Criteria that may be analyzed for determining a QoS profile include throughput, packet error rate, delay and jitter that may be associated with the use of an application on the network. Network operators may utilize QoS profiles to establish levels of service for their subscribers. For example, one measure that may be utilized is a bandwidth parameter, criteria or threshold that would determine the permitted use of a network's resources by a user's application.

Traffic flows, applications, or service flows may have one or more service flow classifications. For example, gateway 311 may direct a traffic flow to wireless device 301 that includes a service traffic flow classification for voice service and a service traffic flow classification for a web browsing service. Likewise, gateway 311 may direct a traffic flow to wireless device 301 that includes a service traffic flow classification for voice service and a service traffic flow classification for a web browsing service. The service traffic flow classifications for voice service and for web browsing service may have different class of service or quality of service (QoS) requirements. In an embodiment, the service flow classifications may include wireless traffic classifications. For example, for WiMAX wireless communication there are wireless traffic quality of service classifications that include: unsolicited grant service (UGS), real time polling service (rtPS), extended real time polling service (ertPS), non-real time polling service (nRTPS), and best effort (BE).

Inspection node 306 inspects a second set of the packets from the service flow utilizing the sampling frequency (405). Sampling may be referred to as the frequency of examining data packets within a traffic flow. Adjusting the sampling frequency is one way of reducing demands on inspection node 306. As mentioned above, certain traffic flows or application may not require high rates of sampling. For example, if the traffic flow or application is identified as a voice-over IP flow, then a very low sampling frequency would be necessary to identify the traffic flow rate because the flow rate is known and invariable during the traffic flow session. A higher sampling frequency may be required for applications involving non-real-time applications, such as instant messaging, web browsing or email applications where the flow rates may be highly variable and uncertain.

In another example, a sampling frequency or strategy for a best effort (BE) service flow may take into account enforcing policies for maximum sustained traffic rates, traffic priority and request/transmission policies, while ignoring other policies such as maximum traffic burst, maximum latency and others that may be of more importance to other service flows.

Inspection node 306 receives a service flow termination message over the gateway to inspection node signaling channel to end monitoring the service flow (406). The service flow termination message alerts inspection node 306 to end monitoring the service flow from gateway 311. Additionally, service flow termination messages may be performed for service flows on the uplink or downlink channels servicing wireless device 301. Upon receiving the service flow termination message, inspection node 306 ends the sampling process on the service flow (407).

Referring now back to FIGS. 1 and 3, communication systems 100 and 300 may comprise any wireless network that provides communication connectivity for wireless devices 101 and 301 to communication with other users. Wireless network protocols that may be utilized by communication systems 100 and 300 may include code division multiple access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), General Packet Radio Services (GPRS), Worldwide Interoperability for Microwave Access (WiMAX) and the like.

Wireless devices 101 and 301 comprise Radio Frequency (RF) communication circuitry and an antenna. The RF communication circuitry typically includes an amplifier, filter, modulator, and signal processing circuitry. Wireless devices 101 and 301 may also include a user interface, memory device, software, processing circuitry, or some other communication components. Wireless devices 101 and 301 could include telephones, smartphones, mobile phones, cellular phones, personal digital assistants (PDAs), personal communicators, handheld game consoles, personal computers (PCs), Ultra-Mobile personal computers (UMPCs), e-books, mobile Internet appliances, wireless network interface cards, handheld televisions and any other consumer appliance with wireless communication capabilities—including combinations thereof.

Base stations 102, 302, 303, and 304 may be any wireless system that provides the air interface to wireless devices and communication connectivity to the communication network. Examples of base stations that may be utilized include base station transceivers (BTSs), base station controllers (BSCs), base station (BSs), radio base stations (RBSs), Node B, enhanced Node B (eNBs) and others. Base stations 102, 302, 303, and 304 may include a number of elements known to those skilled in the art comprising a transceiver, power amplifier, combiner, duplexer, antenna and control function. Further, base stations 102, 302, 303, and 304 may comprise one antenna or multiple antennas having corresponding sectors and frequency assignments. Base stations 102, 302, 303, and 304 may have several transceivers and corresponding antennas which allow it to serve several different frequencies and different sectors of the base station.

Access networks 103 and 305 provide communication connectivity and acts as an aggregator of traffic or interworking device between their respective base stations and networks and any other access nodes, base stations or base station controllers and networks. Examples of network elements that may be part of access networks 103 and 305 may include an access service network gateway (ASN-GW), wireless local access network access gateway (WAG), packet data gateway (PDG), serving GPRS support node (SGSN), mobile switching center (MSC) and packet data serving node (PDSN).

Access network 305 is further shown as comprising IP aggregator 310 and gateway 311. In an embodiment, service flows are initiated at gateway 311. Gateway 311 then has the ability to map the service flow identifier to an IP address that is used by home agent 307 and network 308. Gateway 311 also has the ability to assign quality of service or class of service attributes to each service flow identifier. For example, in WiMAX, a WiMAX QoS may include UGS, rtPS, ertPS, nrtPS and BE qualities of service. WiMAX base stations would then enforce the QoS properties for service flows on the uplinks and downlinks servicing the WiMAX wireless devices.

Home agent 307 is any device in a wireless network the maintains IP connectivity between a wireless device and an IP network. As illustrated in FIG. 3, home agent 307 provides an IP interface between access network 305 and 308.

Networks 104 and 308 may be any network or collection of networks that couple, link, or otherwise operatively connect their respective access networks with other devices or systems. Networks 104 and 308 may include other secondary data networks. In an example, networks 104 and 308 may include a backhaul network, a local network, a long distance network, a packet network, the internet, or any combination thereof, as well as other types of networks.

Networks 104 and 308 include multiple network elements to facilitate communication between gateways and other communication networks. These may include elements that perform network management functions. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management. Elements that may perform management functions comprise authentication servers, provisioning servers, security servers, billing platforms and any other platform that enables a network provider to manage its network. They may also maintain subscriber information associated with users that have permission to utilize their respective communication systems.

Networks 104 and 308 may also utilize other network elements to provide data connectivity to other networks. Examples of these network elements comprise networking routers such as home agents (HAs) and foreign agents (FAs).

Inspection nodes 105 and 306 comprise a device or collection of devices capable of reading data packets from a data flow, inspecting one or more of the packets for application signatures or attributes, determining policy breaches, and generating policy enforcement notifications to various network elements. Inspection nodes 105 and 306 could include processing circuitry and other processing components. Typical examples are microprocessors, integrated circuits, application specific integrated circuits, call processing systems, computers, servers, or other types of processing systems. Inspection nodes 105 and 306 may interface to and provide services to multiple communication network elements. Further, they may reside in a single device or may be distributed across multiple devices or locations within their respective communication systems.

An example of inspection nodes 105 and 306 could be a deep packet inspection (DPI) system. DPI systems have the capability of looking into the payload of an application packet or traffic stream and make decisions regarding the data based upon the content of the data. One skilled in the art would understand that any number of methods and processes may be used to accomplish this task. These may include using signature-matching technology along with heuristic analysis of the data in order to determine the impact of that traffic stream on the network. DPI differs from other packet inspection processes in that DPI also examines the payload in the data packet. Other techniques, such as stateful packet inspection, typically only inspect the header information. As such, DPI techniques can examine data packets at layer 2 through layer 7 of the Open Systems Interconnection (OSI) model, typically focusing on the application layer or layer 7.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing traffic at an inspection node for a wireless communication system comprising:
receiving an event at the inspection node to begin monitoring a traffic flow, wherein the event comprises a flow identifier associated with the traffic flow;
receiving the traffic flow at the inspection node, wherein the traffic flow comprises a plurality of packets;
inspecting the plurality of the packets to obtain an application identifier;
based upon the flow identifier and the application identifier, performing a sampling process on the traffic flow, adjusting a frequency for inspecting the traffic flow to decrease the frequency when a lower frequency will identify a traffic flow rate of the traffic flow, and inspecting a second set of packets using the adjusted frequency; and terminating the sampling process upon determining the end of the traffic flow when a service flow termination message is received.

2. The method of claim 1 wherein the flow identifier comprises a service flow identifier associated with an internet protocol address for the traffic flow.

3. The method of claim 1 wherein the event comprises a service flow identifier, an internet protocol address, a quality of service type and at least one quality of service parameter.

4. The method of claim 1 wherein adjusting the frequency for inspecting the traffic flow is based upon a quality of service type.

5. The method of claim 4 wherein adjusting the frequency for inspecting the traffic flow is based upon an application type.

6. The method of claim 5 wherein adjusting the frequency for inspecting the traffic flow is based upon a protocol type.

7. The method of claim 1 wherein adjusting the frequency for inspecting the traffic flow is based upon a network policy associated with a service flow.

8. The method of claim 7 wherein the network policy comprises at least one of the following: an application type, a protocol type, a quality of service type, a maximum sustained traffic rate, a minimum reserved traffic rate and a maximum traffic burst.

9. The method of claim 1 wherein the traffic flow is an internet protocol traffic flow.

10. The method of claim 1 wherein the traffic flow is a wireless protocol traffic flow.

11. The method of claim 1 wherein determining the end of the traffic flow comprises detecting the end of the of traffic flow.

12. The method of claim 1 wherein determining the end of the traffic flow comprises receiving a termination event to end monitoring the traffic flow.

13. A method for evaluating communication traffic in a network comprising:
receiving a service flow creation message at an application layer inspection node over a gateway to inspection node signaling channel to begin monitoring a service flow, wherein the service flow creation message comprises a service flow identifier and a policy identifier;
receiving the service flow at the application layer inspection node over a gateway to inspection node data link, wherein the service flow comprises a plurality of packets;
inspecting a first set of the plurality of the packets to obtain an application identifier;
based upon the application identifier and service flow identifier, determining an adjusted sampling frequency for the service flow to decrease the frequency when a lower frequency will identify a traffic flow rate of the traffic flow;
inspecting a second set of the plurality of packets using the adjusted sampling frequency; and
receiving a service flow termination message at the application layer inspection node over a gateway to inspection node signaling channel to end monitoring the service flow; and
terminating the inspection of the second set of plurality of packets when a service flow termination message is received.

14. The method of claim 13 wherein determining the adjusted sampling frequency comprises evaluating a network policy associated with the policy identifier.

15. The method of claim 14 wherein the network policy comprises at least one of the following: an application type, a protocol type, a quality of service type, a maximum sustained traffic rate, a minimum reserved traffic rate and a maximum traffic burst.

16. The method of claim 13 wherein the adjusted sampling frequency comprises inspecting the second set of plurality of data packets at a rate less than the rate the second set are received at the application layer inspection node when the application type comprises a voice over internet protocol application type.

17. An application layer data inspection node comprising:
a signaling channel:
for receiving a service flow creation message to begin monitoring a service flow, wherein the service flow creation message comprises a service flow identifier and a policy identifier, and
for receiving a service flow termination message to end monitoring the service flow;
a data channel for receiving the service flow, wherein the service flow comprises a plurality of packets; and
a processor configured to:
inspect a first set of the plurality of the packets to obtain an application identifier;
based upon the application identifier and service flow identifier, adjust a sampling frequency for the service flow to decrease the frequency when a lower frequency will identify a traffic flow rate of the traffic flow; and
inspect a second set of the plurality of packets using the adjusted sampling frequency.

18. The method of claim 17 wherein determining the adjusted sampling frequency comprises evaluating a network policy associated with the policy identifier.

19. The method of claim 18 wherein the network policy comprises at least one of the following: an application type, a protocol type, a quality of service type, a maximum sustained traffic rate, a minimum reserved traffic rate and a maximum traffic burst.

* * * * *